US008715451B2

(12) United States Patent
Korai et al.

(10) Patent No.: US 8,715,451 B2
(45) Date of Patent: May 6, 2014

(54) HEAT PRESSING APPARATUS WITH PUNCTURE PREVENTION FUNCTION AND METHOD FOR PRODUCING WOODY MATERIAL

(75) Inventors: Hideaki Korai, Tsukuba (JP); Atsushi Sumida, Nagoya (JP); Takayoshi Osada, Kakamigahara (JP); Osamu Yasuda, Seki (JP); Keishi Tanaka, Kakamigahara (JP)

(73) Assignees: Forestry and Forest Products Research Institute, Tsukuba-Shi (JP); Swood Company Limited, Kakamigahara-Shi (JP)

( * ) Notice: Subject to any disclaimer, the term of this patent is extended or adjusted under 35 U.S.C. 154(b) by 154 days.

(21) Appl. No.: 12/589,201

(22) Filed: Oct. 19, 2009

(65) Prior Publication Data

US 2010/0101721 A1 Apr. 29, 2010

(30) Foreign Application Priority Data

Oct. 23, 2008 (JP) ................................ 2008-272655

(51) Int. Cl.

*B29C 65/00* (2006.01)
*B31B 1/60* (2006.01)
*B32B 37/00* (2006.01)
*B30B 9/00* (2006.01)

(52) U.S. Cl.

USPC ................ 156/286; 156/285; 156/60; 100/90

(58) Field of Classification Search

CPC ........ B29C 65/10; B29C 65/18; B29C 65/04; B32B 9/042; B32B 21/00; B32B 21/04; B32B 17/062; B32B 23/044; B32B 21/13; B32B 37/10; B32B 37/1009; B32B 37/12; B32B 37/1207; B32B 38/0036; B32B 38/004

USPC .............................. 156/60, 285, 286; 100/90

See application file for complete search history.

(56) References Cited

U.S. PATENT DOCUMENTS 5,147,485 A * 9/1992 Gajewski et al. ............ 156/104
5,580,409 A * 12/1996 Andersen et al. ............ 156/210

(Continued)

FOREIGN PATENT DOCUMENTS

JP 0857803 3/1996
JP 11166158 6/1999

(Continued)

OTHER PUBLICATIONS

*Patent Abstracts of Japan*, "Inorganic Oxide-Containing Adhesive, Hardening Composition, Hardened Material and Forming made of the Hardened Material," Publication No. 09-132731, May 20, 1997, Application No. 07-314726, filed Aug. 11, 1995.

(Continued)

*Primary Examiner* — Christopher Schatz
*Assistant Examiner* — Matthew Hoover
(74) *Attorney, Agent, or Firm* — Lipsitz & McAllister, LLC

(57) ABSTRACT

[Problem to be Solved] When a wood raw material is heat-pressed in order to produce a woody material or woody board, steam is generated in an interior of the wood raw material. The heat-pressed wood raw material is then decompressed with the steam staying in the interior of the wood raw material. This causes a puncture or a rupture of the woody material. The puncture occurs in the last phase of the production process, thus spoiling the entire production process. In order to avoid the puncture, the wood raw material needs to be dried completely. This requires a large amount of energy.

[Solution] In order to solve the foregoing problems, the present invention provides a heat pressing apparatus and a method for producing a woody material, the method including the steps of:

(a): coating or spraying a bonding material on a wood raw material that is an aggregate composed of a single plate, a sheet-like article in which fibers are opened by a rolling, a thin stick-like article, a flake-like article, a strand-like article, and the like;

(b): forming the wood raw material coated or sprayed with the bonding material in the step (a) into a specified shape; and (c): heat-pressing the wood raw material formed into the specified shape, while subjecting the wood raw material to degassing treatment to release the steam, which is generated and stays in the interior of the wood raw material, to the outside, thus to obtain the woody material.

7 Claims, 11 Drawing Sheets

(56) References Cited

U.S. PATENT DOCUMENTS

| | | | | |
|---|---|---|---|---|
| 2002/0127392 | A1 * | 9/2002 | Vaders | 428/332 |
| 2005/0132558 | A1 * | 6/2005 | Hennessy et al. | 29/525 |
| 2008/0051547 | A1 | 2/2008 | Wakabayashi et al. | |

FOREIGN PATENT DOCUMENTS

| | | | |
|---|---|---|---|
| JP | 11-207704 | * | 8/1999 |
| JP | 11207704 | | 8/1999 |
| JP | 11333965 | | 12/1999 |
| JP | 2000160106 | | 6/2000 |
| JP | 2000-280207 | * | 10/2000 |
| JP | 2000280207 | | 10/2000 |
| JP | 2000292056 | | 10/2000 |
| JP | 2000296502 | | 10/2000 |
| JP | 2002080800 | | 3/2002 |
| JP | 2002535185 | | 10/2002 |
| JP | 2004250310 | | 9/2004 |
| JP | 2005016291 | | 1/2005 |
| JP | 2006056945 | | 3/2006 |
| JP | 2006-231621 | * | 9/2006 |
| JP | 2006231621 | | 9/2006 |
| JP | 2007063305 | | 3/2007 |
| JP | 2007119662 | | 5/2007 |
| JP | 2008162909 | | 7/2008 |

OTHER PUBLICATIONS

*Patent Abstracts of Japan*, "Inorganic Adhesive Composition", Publication No. 09-263732, Oct. 7, 1997, Application No. 08-074392, filed Mar. 28, 1996.

* cited by examiner

HEAT PRESSING APPARATUS WITH PUNCTURE PREVENTION FUNCTION AND METHOD FOR PRODUCING WOODY MATERIAL

This application claims priority of Japanese Patent Application No. 2008-272655 filed Oct. 23, 2008, which is incorporated herein and made a part hereof by reference.

BACKGROUND OF THE INVENTION

The present invention relates to a heat pressing apparatus that heat-presses a wood raw material together with an adhesive to produce a woody material, and relates to a method for producing the woody material, the wood raw material being an aggregate composed of a single plate, a sheet-like article in which fibers are opened by a rolling, a thin stick-like article, a flake-like article, a strand-like article, and the like. More particularly, the present invention relates to a technique for releasing steam, which stays in an interior of the wood raw material, to the outside when the material is heat-pressed, thereby to prevent a puncture caused by the steam.

Wood fibers or wood chips are added with a bonding material, and are formed into a woody material. The woody material is called a fiber board or a particle board, or may be collectively called a woody board. The woody material is produced by a heat-press forming process. In this process, the wood fibers or wood chips are added with the bonding material, such as phenolic resin adhesive, and are formed into a mat, and then the mat is pressed, while being heated to a temperature at which the bonding material is hardened. Heat pressing apparatuses have been widely used for such heat-press forming process.

The heat pressing apparatuses are designed to simultaneously heat and press the mat by heated surfaces of press platens.

When the wood raw material (mat) has a density of 0.4 $g/cm^3$, the woody material (woody board) to be produced has a density greater than 0.4 $g/cm^3$, and more specifically, greater than 0.7 $g/cm^3$. Thus, the compressed wood raw material prevents the steam in the interior of the material from releasing to the outside. The steam therefore tends to stay in the interior of the material.

Then, this steam is abruptly discharged to the outside, when the press platens decompress the woody material. This causes a phenomenon or a rupture of the woody material or woody board. The phenomenon is called a puncture. The puncture occurs in the last phase of the woody board production process. Thus, the puncture spoils almost the whole production process. This leads to a substantial reduction in productivity, and therefore, involves an increase in production costs.

The aforementioned puncture phenomenon also occurs when the heat-pressing continues or when the wood raw material is heat-pressed under a high temperature and high pressure with its side surfaces shielded to obtain a woody material having excellent dimension stability.

It is thus crucial to prevent the puncture from occurring in the woody board production process. However, currently there is hardly any solution available to effectively preventing the puncture, except drying the wood raw material sufficiently before heat-pressed.

Another example technique for preventing the puncture is also disclosed: heat-pressing work is done in a vacuum space. However, this technique is not practical due to the need for a more complex system and the lower productivity.

Also, an enormous amount of energy must be needed to reduce water content of the wood raw material, to the extent that the puncture is prevented. This enormous amount of energy is used only for a step of drying the wood raw material, but not used for forming the woody material. In turn, the heated wood raw material must be cooled when the adhesive is coated on the material.

In the event that, in order to avoid wasting the enormous amount of energy, the wood raw material having high water content is coated with the adhesive without drying the material, and is subjected to forming and heat-pressing, a puncture would occur and preclude the production of the woody material. Therefore, it is desirable to prevent a puncture from occurring when the press platens heat-press and decompress the wood raw material, even if the wood raw material has high water content. This leads to skipping the drying step, and thus, achieves an energy-saving, space-saving production process.

RELATED PRIOR ART DOCUMENTS

[Patent Document 1] Published Japanese Translation of PCT application No. 2002-535185 (JP-A-2002-535185)
[Patent Document 2] Japanese Patent Application Publication No. 2000-296502 (JP-A-2000-296502)
[Patent Document 3] Japanese Patent Application Publication No. 2006-231621 (JP-A-2006-231621)
[Patent Document 4] Japanese Patent Application Publication No. 2000-292056 (JP-A-2000-292056)
[Patent Document 5] Japanese Patent Application Publication No. 08-57803 (JP-A-08-57803)

Objects of the present invention include to: provide a heat-pressing technique for heat-pressing a raw material having high water content, such as wood raw material, without a step of drying the raw material, while appropriately preventing a puncture phenomenon, which can occur in an adhesive layer due to steam generated in an interior of the wood raw material, when the wood raw material is heat-pressed and decompressed; allow for an energy-saving, space-saving production process; and obtain a high-quality, high-productivity woody material.

SUMMARY OF THE INVENTION

In order to solve the foregoing problems, the present invention provides a heat pressing apparatus including a heat pressing portion, the apparatus being for heat-pressing a wood raw material with an adhesive added thereto to bond the wood raw material together by the hardened adhesive, and for forming the wood raw material into a woody material, such as plywood, particle board and fiber board, in which the heat pressing portion is provided with degassing means for releasing steam that is generated and stays in an interior of the wood raw material to the outside, when the wood raw material is heat-pressed.

In accordance with the heat pressing apparatus, the degassing means may include: pressure air supply means connected in contact with the wood raw material; and a pressure air source communicated with the pressure air supply means. When the wood raw material is heat-pressed, the degassing means may deliver pressure air from the pressure air supply means to pressurize the wood raw material on both its upper surface and lower surface. Simultaneously, the degassing means may release the steam that is generated and stays in the interior of the wood raw material to the outside in conjunction with discharging the delivered pressure air through side surfaces of the wood raw material.

In accordance with the heat pressing apparatus, the degassing means may further include: shields that shield the respective side surfaces of the wood raw material; a suction air source; and an air vent that is formed through one of the shields and is communicated with the suction air source. When the wood raw material that is stacked in layers inside of the shields is heat-pressed, the degassing means may deliver pressure air and discharge the pressure air from the air vent of the shield to release the steam that is generated and stays in the interior of the wood raw material to the outside in conjunction with discharging the pressure air.

In accordance with the heat pressing apparatus, the degassing means may include: discharge means connected in contact with the wood raw material; and a suction air source communicated with the discharge means. When the wood raw material is heated-pressed, the degassing means may draw or decompress the wood raw material using the discharge means and the suction air source communicated with the discharge means. Simultaneously, the degassing means may release the steam that is generated and stays in the interior of the wood raw material to the outside in conjunction with an air flow discharged from the discharge means.

In accordance with the heat pressing apparatus, the degassing means may further include: shields that shield the respective surfaces of the wood raw material; a pressure air source; and an air vent that is formed through one of the shields and is communicated with the pressure air source. The degassing means may deliver pressure air through the air vent of the shield to pressurize the wood raw material in a direction from the side surface of the wood raw material, and may simultaneously release the steam that is generated and stays in the interior of the wood raw material to the outside in conjunction with an air flow discharged from the discharge means.

In accordance with the heat pressing apparatus, the degassing means may further include: shields that shield the respective side surfaces of the wood raw material; and an air vent that is formed through one of the shields and is communicated with the suction air source. The degassing means may release the steam that is generated and stays in the interior of the wood raw material to the outside in conjunction with an air flow discharged from the discharge means and the air vent of the shield.

In accordance with the heat pressing apparatus, the heat pressing portion may include a pair of heat plates, and the degassing means may include: pressure air supply means and discharge means that are connected to either one of the heat plates; a pressure air source connected to the pressure air supply means; and a suction air source connected to the discharge means. The degassing means may release the steam that is generated and stays in the interior of the wood raw material to the outside in conjunction with an air flow discharged by the suction air source.

In accordance with the heat pressing apparatus, the degassing means may further include: shields that shield the respective side surfaces of the wood raw material; and an air vent that is formed through one of the shields and is communicated with the suction air source. The degassing means may release the steam that is generated and stays in the interior of the wood raw material to the outside in conjunction with an air flow discharged from the discharge means connected to one of the heat plates and from the air vent of the shield.

In order to solve the foregoing problems, the present invention also provides a continuous heat pressing apparatus including a heat pressing portion that continuously heat-presses a wood raw material with an adhesive added thereto, the apparatus being for bonding the wood raw material together by the hardened adhesive and for continuously forming the wood raw material into a woody material, such as plywood, particle board and fiber board, in which the heat pressing portion is provided with degassing means for releasing steam that is generated and stays in an interior of the wood raw material to the outside when the wood raw material is heat-pressed.

In accordance with the continuous heat pressing apparatus, the degassing means may include: pressure air supply means connected in contact with the wood raw material; and a pressure air source communicated with the pressure air supply means. When the wood raw material is heat-pressed, the degassing means may deliver pressure air from the pressure air supply means to pressurize the wood raw material on both its upper surface and lower surface. Simultaneously, the degassing means may release the steam that is generated and stays in the interior of the wood raw material to the outside in conjunction with discharging the delivered pressure air through side surfaces of the wood raw material.

In accordance with the continuous heat pressing apparatus, the degassing means may include: discharge means connected in contact with the wood raw material; and a suction air source communicated with the discharge means. When the wood raw material is heated-pressed, the degassing means may draw or decompress the wood raw material using the discharge means and the suction air source communicated with the discharge means. Simultaneously, the degassing means may release the steam that is generated and stays in the interior of the wood raw material to the outside in conjunction with an air flow discharged from the discharge means.

In accordance with the continuous heat pressing apparatus, the heat pressing portion may include a pair of heat plates, and the degassing means may include: pressure air supply means and discharge means that are connected to either one of the heat plates; a pressure air source connected to the pressure air supply means; and a suction air source connected to the discharge means. The degassing means may release the steam that is generated and stays in the interior of the wood raw material to the outside in conjunction with an air flow discharged by the suction air source.

In order to solve the foregoing problems, the present invention also provides a heat pressing apparatus including a heat pressing portion, the apparatus being for heat-pressing a wood raw material with an adhesive added thereto to bond the wood raw material together by the hardened adhesive, and for forming the wood raw material into a woody material, such as plywood, particle board and fiber board, in which the heat pressing portion includes a pair of heat plates; pressure air supply means connected to either one of the heat plates; a pressure air source connected to the pressure air supply means; and discharge means provided in the other heat plate, and in which a pressure air flow allows steam, which is generated and stays in an interior of the wood raw material, to be released to the outside through the discharge means. For example, the discharge means provided in the other heat plate may include: an air outlet vent; and an air discharge passage connected to the air outlet vent. The steam in the interior of the wood raw material is released from the air outlet vent and the air discharge passage to the outside of the material.

The present invention further provides a heat pressing apparatus including a heat pressing portion, the apparatus being for heat-pressing a wood raw material with an adhesive added thereto to bond the wood raw material together by the hardened adhesive, and for forming the wood raw material into a woody material, such as plywood, particle board and fiber board, in which the heat pressing portion includes: a pair of heat plates; suction decompression means provided in either one of the heat plates; and air intake means provided in the other heat plate, and in which the wood raw material is drawn or decompressed to release steam, which is generated and stays in an interior of the wood raw material, to the outside of the wood raw material.

In order to solve the foregoing problems, the present invention also provides a method for producing a woody material, the method including the steps of:

(a): coating or spraying a bonding material on the wood raw material that is an aggregate composed of a single plate, a sheet-like article in which fibers are opened by a rolling, a thin stick-like article, a flake-like article, a strand-like article, and the like;

(b): forming the wood raw material coated or sprayed with the bonding material in the step (a) into a specified shape; and (c): heat-pressing the wood raw material formed into the specified shape, while subjecting the wood raw material to degassing treatment to release the steam, which is generated and stays in the interior of the wood raw material, to the outside, thus to obtain the woody material.

In accordance with the method for producing a woody material, the degassing treatment in the step (c) may be conducted by injecting pressure air into the wood raw material and/or drawing the pressure air from the wood raw material or decompressing the wood raw material.

In accordance with any one of the methods for producing a woody material, the wood raw material may be heat-pressed under a high temperature and high pressure with side surfaces of the wood raw material shielded by shields.

In order to solve the foregoing problems, the present invention further provides a method for producing a woody material, the method including the steps of:

(a): coating or spraying a bonding material on the wood raw material that is an aggregate composed of a single plate, a sheet-like article in which fibers are opened by a rolling, a thin stick-like article, a flake-like article, a strand-like article, and the like;

(b): forming the wood raw material coated or sprayed with the bonding material in the step (a) into a specified shape;

(c): heat-pressing the wood raw material that is formed into the specified shape, and forming the heat-pressed wood raw material into a specified shape; and (d): cooling the wood raw material that results from the step (c) to obtain a woody material having an internal temperature of 100 degree Celsius or lower.

In accordance with any one of the heat pressing apparatuses and the methods for producing a woody material, the wood raw material may be heat-pressed using high frequency heating.

Having the aforementioned constructions, the present invention enables to appropriately prevent a puncture phenomenon, which can occur in an adhesive layer due to the steam generated in the interior of the wood raw material, when the wood raw material is heat-pressed and decompressed. In addition, the present invention allows a raw material having high water content to be heat-pressed without a step of drying the raw material. Furthermore, the present invention enables not only to achieve an energy-saving, space-saving production process, but also to provide a high-quality, high-productivity woody material.

BRIEF DESCRIPTION OF THE DRAWINGS

The present invention will hereinafter be described in conjunction with the appended drawing figures, wherein like reference numerals denote like elements, and.

DETAILED DESCRIPTION

Figure 1:
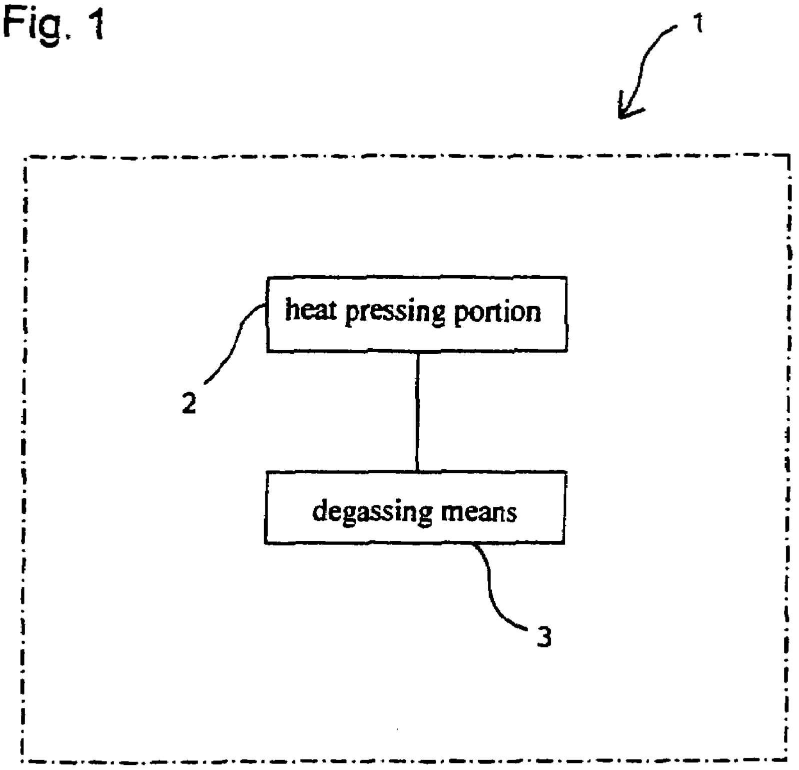
FIG. 1 is a schematic diagram illustrating one exemplary embodiment of a heat pressing apparatus.

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

A wood raw material used in a heat pressing apparatus of the present invention may be in any form including a single plate, a sheet-like article in which fibers are opened by a rolling, a thin stick-like article, a flake-like article and a strand-like article. The heat pressing apparatus of the invention allows steam in an interior of the wood raw material to be effectively released to the outside, when the wood raw material in any form is heat-pressed.

The heat pressing apparatus of the invention is used to produce a woody material, such as plywood, oriented strand board (OSB), fiber board and particle board. The heat pressing apparatus of the invention allows for efficient production of high-quality, energy-saving products of any of those woody materials, while preventing a puncture.

Conventional adhesives may be used to be added to the wood raw material. The conventional adhesives include urea resin adhesive, melamine resin adhesive, phenolic resin adhesive and isocyanate resin adhesive. The wood raw material added with any one of the conventional adhesives shows the effect of preventing a puncture.

Generally, a heat-press temperature depends on type of adhesive or type of woody material, and falls within a range from 120° C. to 220° C. The heat-press temperature from 120° C. to 220° C. exerts no particular influence upon the operations of the present invention.

The heat pressing apparatus of the present invention includes a heat pressing portion. The heat pressing apparatus is designed to heat-press a wood raw material with an adhesive added thereto to bond the wood raw material together by the hardened adhesive, and designed to form the wood raw material into a woody material, such as plywood, particle board and fiber board. The heat pressing portion is provided with degassing means for releasing steam, which is generated and stays in the interior of the wood raw material, to the outside when the wood raw material is heat-pressed.

The degassing means includes: pressure air supply means connected in contact with the wood raw material; and a pressure air source communicated with the pressure air supply means. When the wood raw material is heat-pressed, the degassing means is designed to deliver pressure air from the pressure air supply means to pressurize the wood raw material on both its upper surface and lower surface. Simultaneously, the degassing means is designed to release the steam that is generated and stays in the interior of the wood raw material to the outside in conjunction with discharging the delivered pressure air from side surfaces of the wood raw material.

The degassing means having this construction may include an air vent for the pressure air. The air vent may be provided in a heat pressing portion, that is, a heat plate. Alternatively, the degassing means may include a case body to deliver the pressure air through the case body. The case body may be connected in contact with a surface of the heat plate and contact the wood raw material.

As the degassing means delivers higher pressure air, the steam in the interior of the wood raw material is more effectively discharged. However, a compressed air pressure that is provided by a generic type of compressor may be high enough to effectively discharge the steam.

The degassing means may be designed to perform suction operation in conjunction with the operation in which the wood raw material is pressurized when heat-pressed. This allows the steam in the interior of the wood raw material to be more effectively discharged. To be more specific, the degassing means includes: discharge means connected in contact with the wood raw material; and a suction air source communicated with the discharge means. When the wood raw material is heated-pressed, the degassing means is designed to draw or decompress the wood raw material using the discharge means and the suction air source communicated with the discharge means. Simultaneously, the degassing means is designed to release the steam that is generated and stays in the interior of the wood raw material to the outside in conjunction with an air flow discharged from the discharge means.

In addition, when heat-pressed, the wood raw material is shielded by shields in an almost airtight manner. One of the shields has an air vent. The degassing means is designed to discharge the pressure air from the air vent of the shield in conjunction with supplying the pressure air, and to draw the pressure air through the air vent. This allows the steam that is generated and stays in the interior of the wood raw material to be further effectively discharged.

The several constructions of the degassing means, which are mentioned above, are also useful for a continuous heat pressing apparatus. To be more specific, the continuous heat pressing apparatus includes a heat pressing portion that continuously heat-presses a wood raw material with an adhesive added thereto. The continuous heat pressing apparatus is designed to bond the wood raw material together by the hardened adhesive and to continuously form the wood raw material into a woody material, such as plywood, particle board and fiber board. The heat pressing portion is provided with degassing means for releasing the steam, which is generated and stays in the interior of the wood raw material, to the outside when the material is heat-pressed. The degassing means includes: pressure air supply means connected in contact with the wood raw material; and a pressure air source communicated with the pressure air supply means. When the wood raw material is heat-pressed, the degassing means is designed to deliver pressure air from the pressure air supply means to pressurize the wood raw material on both its upper surface and lower surface. Simultaneously, the degassing means is designed to release the steam that is generated and stays in the interior of the wood raw material to the outside in conjunction with discharging the delivered pressure air from side surfaces of the wood raw material. This enables continuous production of high-quality products.

The degassing means includes: discharge means connected in contact with the wood raw material; and a suction air source communicated with the discharge means. When the wood raw material is heated-pressed, the degassing means is designed to draw or decompress the wood raw material using the discharge means and the suction air source communicated with the discharge means. Simultaneously, the degassing means is designed to release the steam that is generated and stays in the interior of the wood raw material to the outside in conjunction with an air flow discharged from the discharge means.

The aforementioned degassing means are also useful for a method for producing a woody material, the method including: coating or spraying a wood raw material with a bonding material (an adhesive); and forming the wood raw material into a specified shape. The wood raw material is an aggregate composed of a single plate, a sheet-like article in which fibers are opened by a rolling, a thin stick-like article, a flake-like article, a strand-like article, and the like.

In accordance with the method for producing a woody material, steam, which is generated and stays in the interior of the wood raw material, is discharged by the degassing means having one of the aforementioned constructions. However, instead of discharging the steam, the steam may be subjected to cooling treatment to condense the steam into water, thereby to prevent a puncture from occurring when the wood raw material is decompressed.

In general, traditionally the wood raw material is dried to water content of almost 0% prior to coating the adhesive on the wood raw material. However, the present invention enables production of high-quality products made of high water content raw materials without causing a puncture.

In relation to the above description, the wood raw material may be heat-pressed using high frequency heating in order to facilitate production of high-quality, thick products.

With reference to the accompanying drawings, exemplary embodiments of the present invention will be described below. Part of the description of the exemplary embodiment of the method for producing a woody material is common to the description of the operations of the apparatus, and therefore the common part of the description is not repeated.

With reference to the accompanying drawings, exemplary embodiments of a heat pressing apparatus according to the present invention will be described below. FIG. 1 is a schematic diagram illustrating one exemplary embodiment of the heat pressing apparatus. In FIG. 1, a reference numeral 1 denotes the heat pressing apparatus. The heat pressing apparatus 1 includes a heat pressing portion 2. The heat pressing apparatus 1 is designed to heat-press a wood raw material with an adhesive added thereto to bond the wood raw material together by the hardened adhesive, and designed to form the wood raw material into a woody material, such as plywood, particle board and fiber board. The heat pressing portion 2 is provided with degassing means 3 for releasing steam, which is generated and stays in the interior of the wood raw material, to the outside when the wood raw material is heat-pressed.

Figure 2:
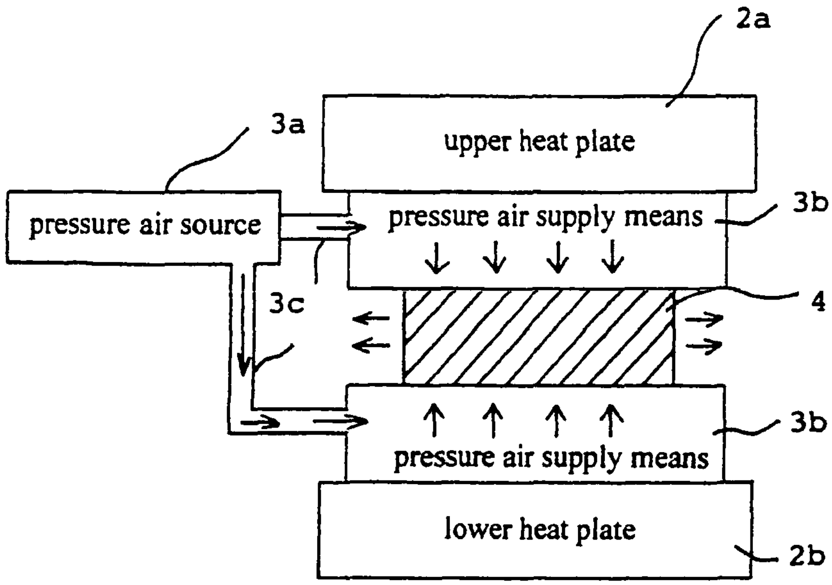
FIG. 2 is a partial sectional view illustrating one exemplary embodiment of degassing means 3 of the heat pressing apparatus shown in FIG. 1.

FIG. 2 is a partial sectional view illustrating one exemplary embodiment of the degassing means 3 of the heat pressing apparatus shown in FIG. 1. The degassing means 3 includes a compressor 3*a* and air tanks 3*b*. The compressor 3*a* serves as a pressure air source and is communicated with the air tanks 3*b*. The air tanks 3*b* serve as pressure air supply means and are connected in contact with a wood raw material 4. The air tanks 3*b* have case bodies. The case bodies have a large number of air holes (not shown) on either an upper surface or a lower surface of the case bodies. The air tanks 3*b* are mounted respectively to an upper heat plate 2*a* and a lower heat plate 2*b* of the heat pressing portion 2 of the heat pressing apparatus. The wood raw material 4 is heat-pressed by moving the heat plates 2*a* and 2*b*. The air tanks 3*b* or the pressure air supply means are connected to the compressor 3*a* or the pressure air source through a communication pipe 3*c*.

In the heat pressing apparatus having the aforementioned construction, when the wood raw material 4 is heat-pressed, pressure air is delivered from the compressor 3*a* or the pressure air source through the air tanks 3*b* or the pressure air supply means to pressurize the wood raw material 4 on both its upper surface and lower surface. The pressure air flows as shown by the arrows in FIG. 2, and then is discharged from side surfaces of the wood raw material 4. In conjunction with discharging the pressure air, the steam, which is generated and stays in the interior of the wood raw material 4, is also released from the side surfaces of the wood raw material 4. Thus, no puncture phenomenon occurs due to the steam in the interior of the wood raw material 4, even when the wood raw material 4 is decompressed.

Figure 3:
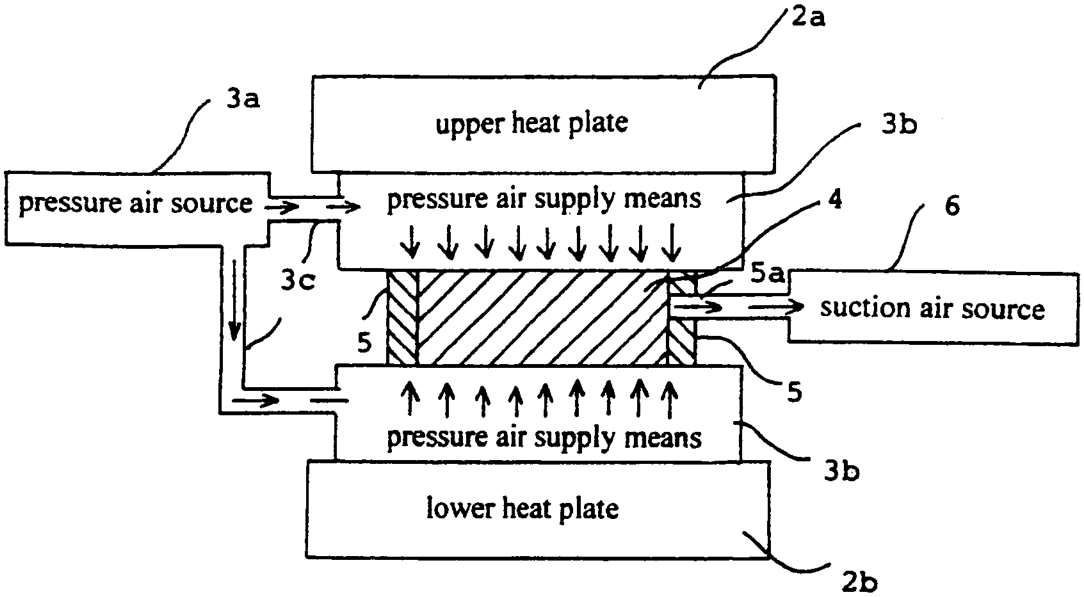
FIG. 3 is a partial sectional view illustrating another exemplary embodiment of the degassing means 3 of the heat pressing apparatus shown in FIG. 1.

FIG. 3 is a partial sectional view illustrating another exemplary embodiment of the degassing means 3 of the heat pressing apparatus shown in FIG. 1. In this exemplary embodiment, the degassing means 3 of the heat pressing apparatus further includes: shields 5; a vacuum pump 6; and an air vent 5*a*. The shields 5 are designed to shield respective side surfaces of a wood raw material 4. The vacuum pump 6 serves as a suction air source. The air vent 5*a* is formed through one of the shields 5 and is communicated with the vacuum pump 6.

The wood raw material 4 is stacked in layers inside of the shields 5. When the wood raw material 4 is heat-pressed, pressure air is injected through the air tanks 3*b* or the pressure air supply means to the upper surface and the lower surface of the wood raw material 4, as shown by the arrows in FIG. 3. The pressure air reaches the interior of the wood raw material 4. Then, as shown by the arrows in FIG. 3, the injected pressure air is discharged through the air vent 5*a* of the shield 5 to the outside, together with steam generated in the interior of the wood raw material 4 due to the heat-pressing. During this discharge operation, an inner space within the shields is maintained at a negative pressure by the vacuum pump 6, so that the steam that is generated and stays in the interior of the wood raw material 4 is released extremely effectively.

Figure 4:
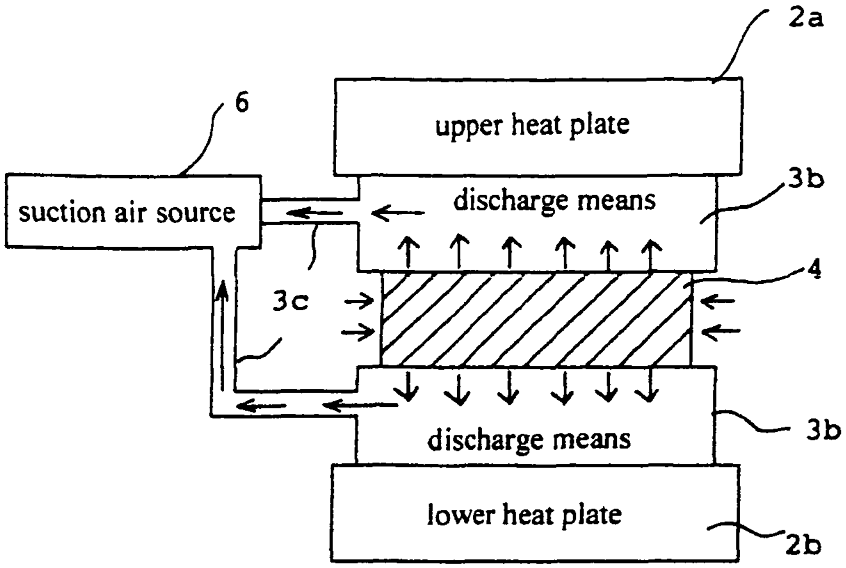
FIG. 4 is a partial sectional view illustrating still another exemplary embodiment of the degassing means 3 of the heat pressing apparatus shown in FIG. 1.

FIG. 4 is a partial sectional view illustrating still another exemplary embodiment of the degassing means 3 of the heat pressing apparatus shown in FIG. 1.

The degassing means 3 includes air tanks 3*b* and a vacuum pump 6. The air tanks 3*b* serve as discharge means and are connected in contact with a wood raw material 4. The vacuum pump 6 serves as a suction air source and is communicated with the air tanks 3*b*. The air tanks 3*b* have case bodies. The case bodies have a large number of air holes (not shown) on either an upper surface or a lower surface of the case bodies. The air tanks 3*b* are mounted respectively to an upper heat plate 2*a* and a lower heat plate 2*b* of the heat pressing portion 2 of the heat pressing apparatus. The wood raw material 4 is heat-pressed by moving the heat plates 2*a* and 2*b*. The air tanks 3*b* or the discharge means are connected to the vacuum pump 6 or the suction air source through a communication pipe 3*c*.

In the heat pressing apparatus having the aforementioned construction, when the wood raw material 4 is heat-pressed, the vacuum pump 6 or the suction air source is activated to draw the wood raw material 4 on both its upper surface and lower surface through the air tanks 3*b*.

Therefore, the air flows as shown by the arrows in FIG. 4, and then is discharged from the upper surface and the lower surface of the wood raw material 4. In conjunction with discharging the air, the steam, which is generated and stays in the interior of the wood raw material 4, is also released from the side surfaces of the wood raw material 4. Thus, no puncture phenomenon occurs due to the steam in the interior of the wood raw material 4, even when the wood raw material 4 is decompressed.

Figure 5:
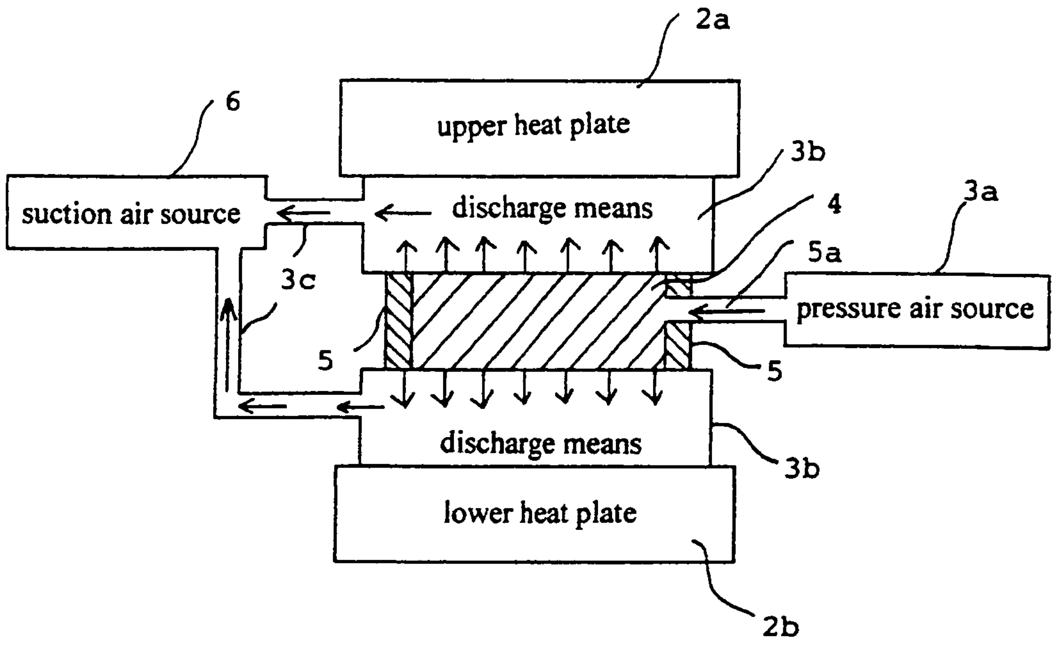
FIG. 5 is a partial sectional view illustrating still another exemplary embodiment of the degassing means 3, shown in FIG. 4, of the heat pressing apparatus.

FIG. 5 is a partial sectional view illustrating still another exemplary embodiment of the degassing means 3, shown in FIG. 4, of the heat pressing apparatus.

In this exemplary embodiment, the degassing means 3 includes: shields 5 and a compressor 3*a*. The shields 5 are designed to shield respective side surfaces of a wood raw material 4. The compressor 3*a* serves as a pressure air source and is communicated with an air vent 5*a*. The air vent 5*a* is formed through one of the shields 5. In the degassing means 3 having this construction, when the wood raw material 4 is heat-pressed, the vacuum pump 6 or the suction air source is activated to draw the wood raw material 4 on its upper surface and lower surface through the air tanks 3*b*.

In contrast, pressure air is injected from the compressor 3*a* or the pressure air source through the air vent 5*a* formed through the shield 5 into the wood raw material 4. This pressure air, together with the steam in the interior of the wood raw material 4, are released to the outside as a discharge air flow through the air tanks 3*b* or the discharge means and through the vacuum pump 6 or the suction air source.

Figure 6:
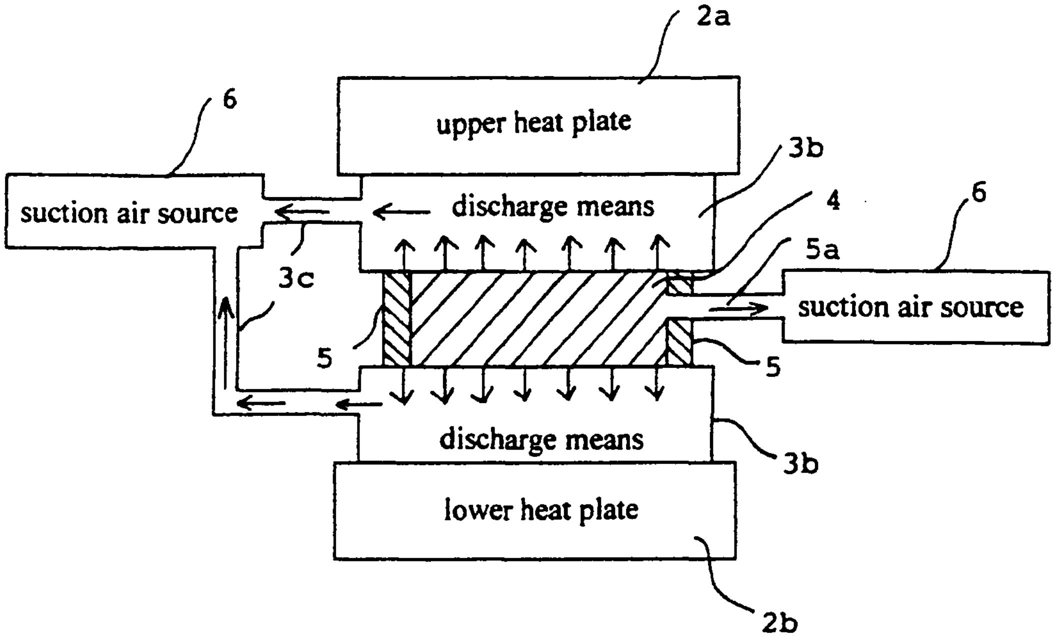
FIG. 6 is a partial sectional view illustrating still another exemplary embodiment of the degassing means 3, shown in FIG. 4, of the heat pressing apparatus.

FIG. 6 is a partial sectional view illustrating still another exemplary embodiment of the degassing means 3, shown in FIG. 4, of the heat pressing apparatus.

In this exemplary embodiment, one of the shields 5 is connected through the air vent 5*a* to the vacuum pump 6 or the suction air source. In the degassing means 3 having this construction, when the wood raw material 4 is heat-pressed, an additional vacuum pump 6 or a suction air source is activated to draw the wood raw material 4 on its upper surface and lower surface through the air tanks 3*b*. Simultaneously, the wood raw material 4 is also drawn by the vacuum pump 6 or the suction air source through the air vent 5*a* formed through the shield 5, and thus is under a negative pressure. Therefore, the steam in the interior of the wood raw material 4 is released together with the air flow to the outside through both the air tanks 3*b* and the air vent 5*c* of the shield 5.

Figure 7:
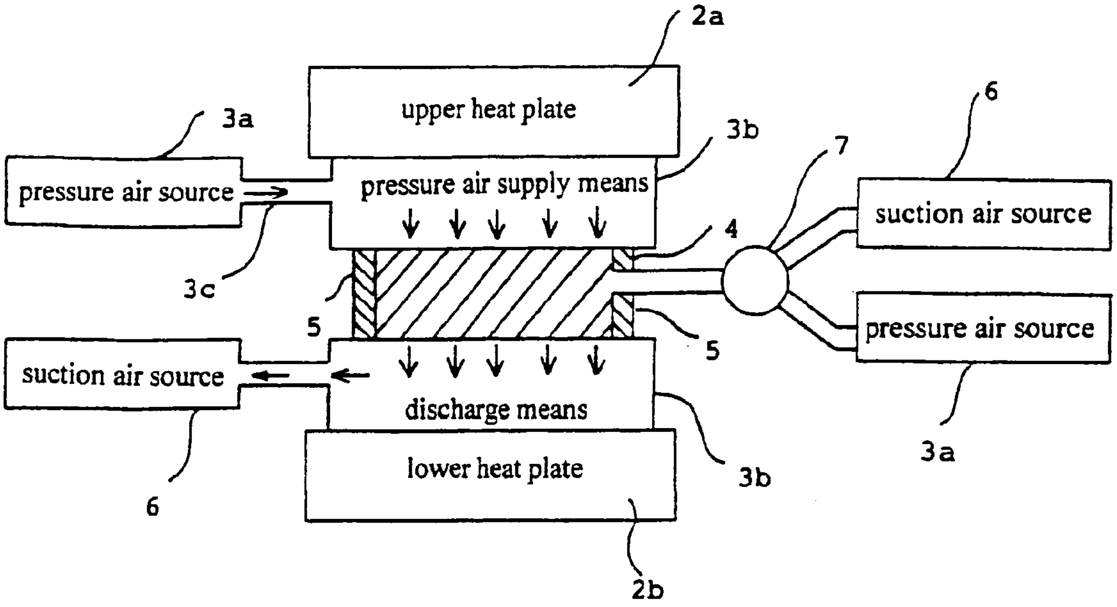
FIG. 7 is a partial sectional view illustrating still another exemplary embodiment of the degassing means 3 of the heat pressing apparatus shown in FIG. 1.

FIG. 7 is a partial sectional view illustrating still another exemplary embodiment of the degassing means 3 of the heat pressing apparatus shown in FIG. 1.

The degassing means 3 includes: a compressor 3*a*; air tanks 3*b*; and a vacuum pump 6. The air tanks 3*b* respectively serve as pressure air supply means and as discharge means, and are connected to either one of a heat plate 2*a* and a heat plate 2*b*. The compressor 3*a* serves as a pressure air source and is connected to the pressure air supply means. The vacuum pump 6 serves as a suction air source, and is connected to the discharge means. The degassing means 3 further includes: shields 5; an additional vacuum pump 6; and an additional compressor 3*a*. The shields 5 are designed to shield respective side surfaces of a wood raw material 4. The additional vacuum pump 6 serves as a suction air source. The additional compressor 3*a* serves as a pressure air source. The additional vacuum pump 6 and the additional compressor 3 are connected through a switching valve 7 to an air vent formed through one of the shields 5.

In this exemplary embodiment, pressure air is delivered to the wood raw material 4 on the side of one of the heat plates, while being drawn from the wood raw material 4 on the side of the other heat plate. Also, the pressure air is injected into or drawn from the wood raw material 4 through the shield 5 via the switching valve 7 in a timely manner.

As shown in FIG. 7, the compressor 3*a* and the vacuum pump 6 that are connected respectively to the air tanks 3*b* are separate from the additional compressor 3*a* and the additional vacuum pump 6 that are connected to the shield 5. However, these separate compressors 3*a* may be combined into one, and these separate vacuum pumps 6 may be combined into one. The compressor 3*a* and the vacuum pump 6 are connected respectively to the air tanks 3*b* through connecting pipes. The connecting pipes may be each provided with a switching valve. In turn, unlike the FIG. 7, the shields 5 may be omitted, and the pressure air may be injected into or drawn from the wood raw material 4 on its upper surface and lower surface to discharge the steam in the interior of the wood raw material 4. In the aforementioned exemplary embodiments shown in FIG. 2 and FIG. 7, the pressure air supply means 3*b* and the discharge means 3*b* are separate members from the heat plates. However, it should be apparent that the pressure air supply means 3*b* and the discharge means 3*b* may be each formed in an interior of the associated heat plate or each formed with the associated heat plate into one unit.

The woody material is produced by each of the aforementioned heat pressing apparatuses in accordance with the following steps.

(a): coating or spraying a bonding material on a wood raw material that is an aggregate composed of a single plate, a sheet-like article in which fibers are opened by a rolling, a thin stick-like article, a flake-like article, a strand-like article, and the like;

(b): forming the wood raw material coated or sprayed with the bonding material in the step (a) into a specified shape; and (c): heat-pressing the wood raw material formed into the specified shape, while subjecting the wood raw material to degassing treatment to release the steam, which is generated and stays in the interior of the wood raw material, to the outside, thus to obtain the woody material.

In the step (c), the degassing treatment may be conducted by injecting the pressure air into the wood raw material and/or drawing the pressure air from the wood raw material or decompressing the wood raw material. In addition, the degassing treatment is conducted in conjunction with heat-pressing the wood raw material, with its side surfaces shielded by the shields, under a high temperature and high pressure.

Figure 8:
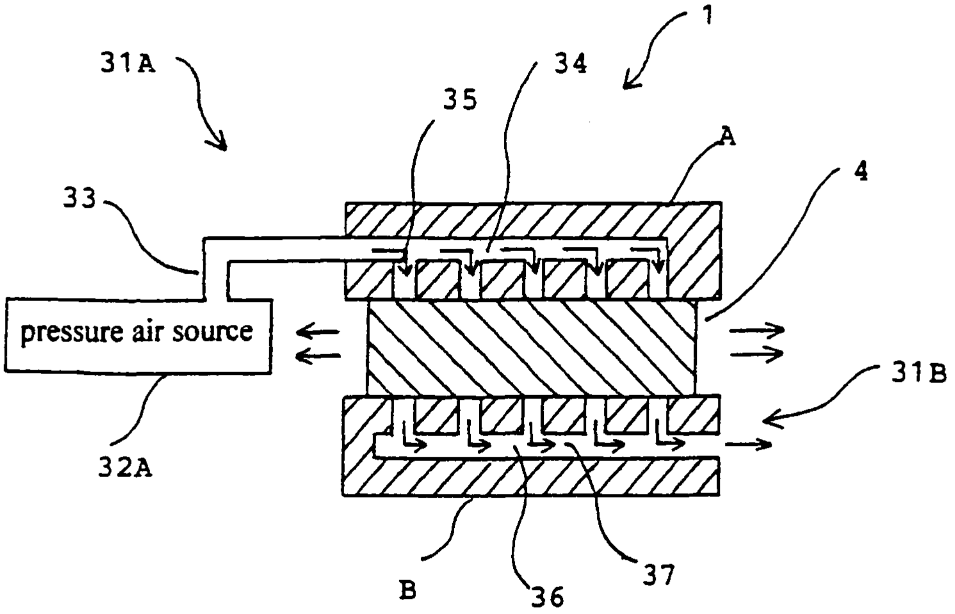
FIG. 8 is a partial sectional view illustrating another exemplary embodiment of the heat pressing apparatus.

FIG. 8 is a partial sectional view illustrating another exemplary embodiment of the heat pressing apparatus according to the present invention.

In FIG. 8, a reference numeral 1 denotes the heat pressing apparatus. The heat pressing apparatus 1 includes a heat pressing portion. The heat pressing apparatus 1 is designed to heat-press a wood raw material with an adhesive added thereto to bond the wood raw material together by the hardened adhesive, and designed to form the wood raw material into a woody material, such as plywood, particle board and fiber board. The heat pressing portion includes a pair of heat plates A and B. The heat pressing portion has: pressure air supply means 31A; a pressure air source 32A; and discharge means 31B. The pressure air supply means 31A is connected to either one of the heat plates A and B. The pressure air source 32A is connected to the pressure air supply means 31A. The discharge means 31B is provided in the other heat plate A or B. A pressure air flow from the pressure air source 32A allows steam, which is generated and stays in an interior of a wood raw material 4, to be released to the outside through the discharge means 31B. The pressure air supply means 31A includes: an air delivery pipe 33; an air intake passage 34; and plural air inlet vents 35. The air intake passage 34 is formed in an interior of the heat plate A and is communicated with the air delivery pipe 33. The plural air inlet vents 35 are formed in place of the air intake passage 34 to supply the pressure air to the wood raw material 4. The discharge means 31B includes: an air discharge passage 36 and plural air outlet vents 37. The air discharge passage 36 is formed in an interior of the heat plate B. The plural air outlet vents 37 are formed in place of the air discharge passage 36 to discharge the pressure air together with the steam to the outside. The pressure air to be injected can be at room temperature. However, the pressure air to be injected may be heated or warmer than the room temperature in order to more effectively discharge the steam. The aforementioned exemplary embodiments all show the significant effect of the heated or warmer pressure air on the discharge performance.

Figure 9:
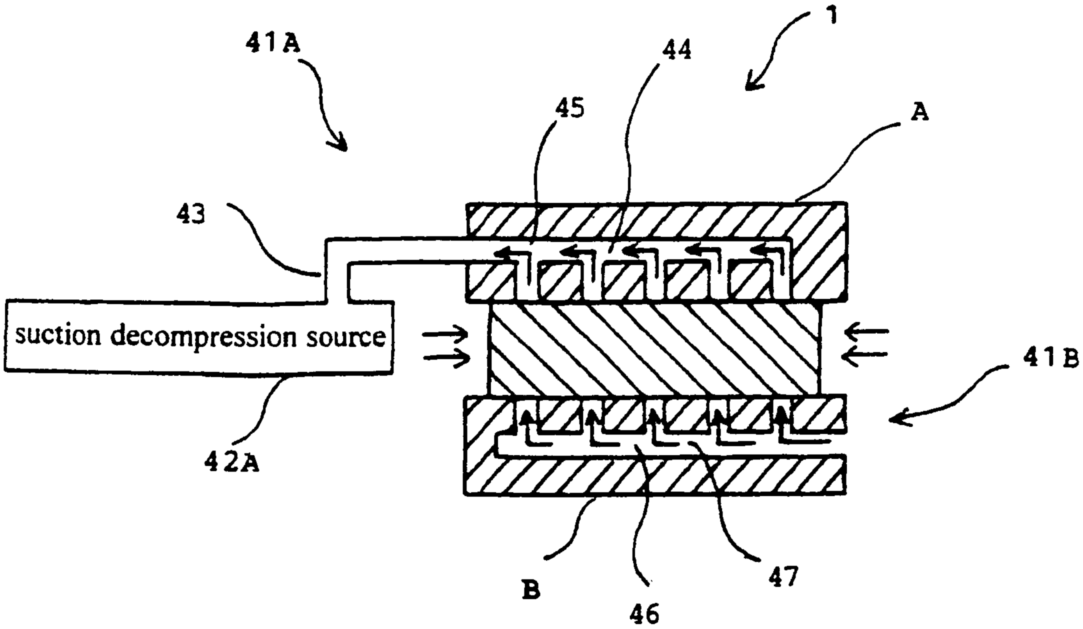
FIG. 9 is a partial sectional view illustrating still another exemplary embodiment of the heat pressing apparatus.

FIG. 9 is a partial sectional view illustrating still another exemplary embodiment of the heat pressing apparatus according to the present invention.

In FIG. 9, a reference numeral 1 denotes the heat pressing apparatus. The heat pressing apparatus 1 includes a heat pressing portion. The heat pressing apparatus 1 is designed to heat-press a wood raw material with an adhesive added thereto to bond the wood raw material together by the hardened adhesive, and designed to form the wood raw material into a woody material, such as plywood, particle board and fiber board. The heat pressing portion includes a pair of heat plates A and B. The heat pressing portion has: suction decompression means 41A; a suction decompression source 42A; and air intake means 41B. The suction decompression means 41A is connected to either one of the heat plates A and B. The suction decompression source 42A serves as a compressor and is connected to the suction decompression means 41A. The air intake means 41B is provided in the other heat plate A or B. The compressor 42A or the suction decompression source draws or decompresses the wood raw material 4 to allow steam, which is generated and stays in the interior of the wood raw material 4, to be released to the outside. The suction decompression means 41A includes: an air discharge pipe 43; an air discharge passage 44; and plural air outlet vents 45. The air discharge passage 44 is formed in an interior of the heat plate A and is communicated with the air discharge pipe 43. The plural air outlet vents 45 are formed in place of the air discharge passage 44 to discharge the steam out of the wood raw material 4. The air intake means 41B includes: an air intake passage 46; and plural air inlet vents 47. The air intake passage 46 is formed in an interior of the heat plate B. The plural air inlet vents 47 are formed in place of the air intake passage 46. Air is drawn through the air inlet vents 47 into the interior of the wood raw material 4 and is discharged together with the steam to the outside of the material 4. The compressor 42A or the suction decompression source is activated to discharge the air, which is drawn into the interior of the wood raw material 4, together with the steam through the suction decompression means 41A, as shown by the arrows in FIG. 9.

Figure 10:
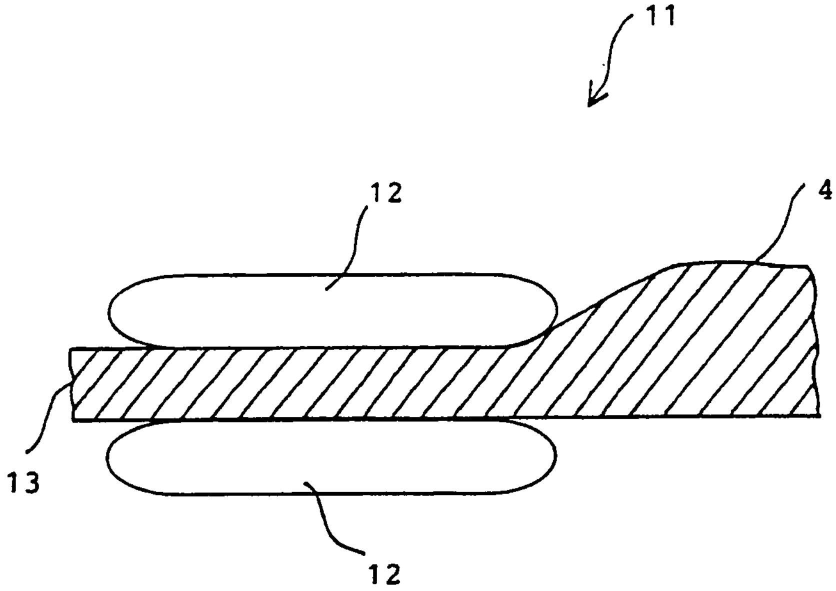
FIG. 10 is a partial sectional side view illustrating one exemplary embodiment of a continuous heat pressing apparatus according to the present invention.

FIG. 10 is a partial sectional side view illustrating one exemplary embodiment of a continuous heat pressing apparatus according to the present invention.

In FIG. 10, a reference numeral 11 denotes the continuous heat pressing apparatus. The continuous heat pressing apparatus 11 includes a pair of upper and lower heat pressing portions 12, 12 that continuously heat-press a wood raw material 4 with an adhesive added thereto. The continuous heat pressing apparatus 11 is designed to bond the wood raw material 4 together by the hardened adhesive and to continuously form the wood raw material 4 into a woody material 13, such as plywood, particle board and fiber board.

The pair of upper and lower heat pressing portions 12, 12 include a heat plate, a heat source, pressure air supply means and/or discharge means. The heat pressing portions 12 are designed to heat-press the wood raw material 4 and to simultaneously form the wood raw material 4 into a woody material 13 in a continuous manner. In conjunction with heat-pressing the wood raw material 4, pressure air is injected into the wood raw material 4 to discharge steam generated in the interior of the wood raw material 4 to the outside, thereby to prevent a puncture. The steam may be discharged out of the wood raw material 4 by drawing the air from the wood raw material 4 in conjunction with injecting the pressure air. Alternatively, the steam may be discharged out of the wood raw material 4 by solely drawing the air from the wood raw material 4 without injecting the pressure air. The pressure air may be injected into/drawn from the wood raw material 4 through an air vent directly formed in an interior of the heat plate or through the air tanks of the aforementioned heat pressing apparatuses. As described above, the compressor and the vacuum pump are used to serve respectively as a pressure air source and a suction air source.

On the left end of the heat pressing portions 12, 12 in FIG. 10, cooling means may be provided. The cooling means is designed to cool the woody material 13 to an internal temperature of 100 degree Celsius or lower in order to condense the steam generated in the interior of the woody material 13 into water. This stabilizes the woody material 13, thereby to prevent a puncture. Alternatively, the cooling means may be provided adjacent to the heat pressing portions 12, 12.

The woody material is produced by the continuous heat pressing apparatus in accordance with the following steps.

(a): coating or spraying a bonding material on a wood raw material that is an aggregate composed of a single plate, a sheet-like article in which fibers are opened by a rolling, a thin stick-like article, a flake-like article, a strand-like article, and the like;

(b): forming the wood raw material coated or sprayed with the bonding material in the step (a) into a specified shape; and (c): heat-pressing the wood raw material formed into the specified shape, while subjecting the wood raw material to degassing treatment to release the steam, which is generated and stays in the interior of the wood raw material, to the outside, thus to obtain the woody material.

The degassing treatment in the step (c) is conducted by injecting the pressure air into the wood raw material and/or drawing the pressure air from the wood raw material or decompressing the wood raw material. In addition, in the step (c), the wood raw material may be heat-pressed under a high temperature and high pressure with the side surfaces of the wood raw material shielded by the shields. Furthermore, in addition to the step (c), the woody material that results from the step (c) may be cooled to an internal temperature of 100 degree Celsius or lower in order to condense the steam generated in the interior of the woody material into water. This stabilizes the woody material, thereby to prevent a puncture.

In accordance with any one of the above heat pressing apparatuses and methods for producing a woody material, the wood raw material may be heat-pressed using high frequency heating in order to facilitate production of thick woody materials.

The description will next focus on a test to verify the effects of the present invention. In this test, a heat pressing apparatus according to the following exemplary embodiment was used to produce woody materials (woody boards).

Figure 11:
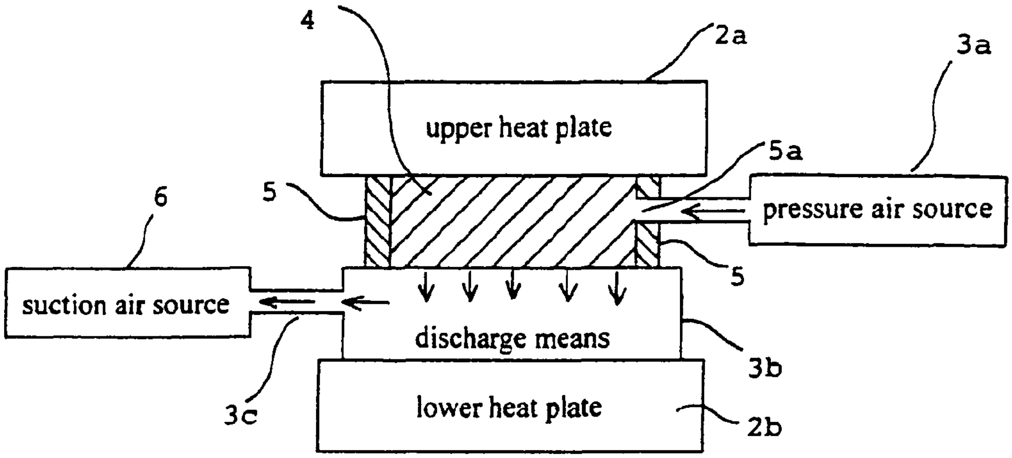
FIG. 11 is a partial sectional side view illustrating a heat pressing portion and degassing means that are major components of a heat pressing apparatus used for a woody board production test.

FIG. 11 is a partial sectional side view illustrating a heat pressing portion and degassing means that are major components of the heat pressing apparatus used for the test.

In this exemplary embodiment, as shown in FIG. 11, the degassing means 3 includes: an air tank 3*b*; a vacuum pump 6; shields 5; and a compressor 3*a*. The air tank 3*b* serves as discharge means and is connected in contact with a wood raw material 4. The vacuum pump 6 serves as a suction air source and is communicated with the air tank 3*b*. The shields 5 are designed to shield the respective side surfaces of the wood raw material 4. The compressor 3*a* serves as a pressure air source and is communicated with an air vent 5*a*. The air vent 5*a* is formed through one of the shields 5. The air tank 3*b* has a case body. The case body has a large number of air holes (not shown) on its upper surface. The air tank 3*b* is mounted to a lower heat plate 2*b* of the heat pressing portion of the heat pressing apparatus. The wood raw material 4 is heat-pressed by moving the heat plate 2*b* and a heat plate 2*a*. The air tank 3*b* or the discharge means is connected to the vacuum pump 6 or the suction air source through a communication pipe 3*c*.

In the heat pressing apparatus having the aforementioned construction, when the wood raw material 4 is heat-pressed, the vacuum pump 6 or the suction air source is activated to draw the wood raw material 4 on its lower surface through the air tank 3*b*. In contrast, air is injected into the wood raw material 4 from the compressor 3*a* or the pressure air source through the air vent 5*a* formed through the shield 5. As shown by the arrows in FIG. 11, the air is released to the outside of the wood raw material 4 as a discharge air flow together with the steam, which is generated in the interior of the wood raw material 4, through the air tank 3*b* or the discharge means and through the vacuum pump 6 or the suction air source communicated with the air tank 3*b*.

The details of the test to verify the effects of the invention will be described below.

(a): Cypress wood was used as a raw material for the production of woody boards. The cypress wood was cut with a circular knife ring to produce wood raw materials or board raw materials. The board raw materials were dried to water content of almost 0%.

(b): A specified amount of water was sprayed on each of the board raw materials such that the board raw materials had one of three water contents of 20%, 30% and 40%, respectively.

(c): The board raw materials that had their respective water contents were individually placed in a rotary drum coating device to spray an isocyanate system adhesive on the board raw material with the adhesive amount of 5 weight percent of the board raw material.

(d): After the isocyanate system adhesive was sprayed, the board raw materials were formed into mats using a forming box having the dimensions of 25 cm×25 cm. The mats were heat-pressed, resulting in woody boards. The woody boards were 1 cm thick. A target board dense was set at 0.7 g/cm$^3$. The woody boards were produced by heat-pressing the board raw materials, which have the three different water contents respectively, at a heat-pressing temperature of 180° C. for 4 minutes, 6 minutes, 8 minutes and 10 minutes.

Then, for the purpose of comparison, woody boards were produced by the conventional heat pressing apparatus in the same manner as by the heat pressing apparatus of the invention.

The woody boards, which were obtained by the heat pressing apparatus according to the exemplary embodiments of the present invention, were compared to the woody boards obtained by the conventional heat pressing apparatus. The results of the comparison are shown as follows:

(1) Woody Boards Produced by the Heat Pressing Apparatus of the Present Invention (a): 20% Water Content Raw Material Heat pressing for 4 minutes No puncture occurred.
Heat pressing for 6 minutes No puncture occurred.
Heat pressing for 8 minutes No puncture occurred.
Heat pressing for 10 minutes No puncture occurred.

(b): 30% Water Content Raw Material

Heat pressing for 4 minutes No puncture occurred.
Heat pressing for 6 minutes No puncture occurred.
Heat pressing for 8 minutes No puncture occurred.
Heat pressing for 10 minutes No puncture occurred.

(c): 40% Water Content Raw Material

Heat pressing for 4 minutes A puncture occurred.
Heat pressing for 6 minutes A puncture occurred.
Heat pressing for 8 minutes No puncture occurred.
Heat pressing for 10 minutes No puncture occurred.

(2) Woody Boards Produced by the Conventional Heat Pressing Apparatus (a): 20% Water Content Raw Material Heat pressing for 4 minutes No puncture occurred.
Heat pressing for 6 minutes No puncture occurred.
Heat pressing for 8 minutes No puncture occurred.
Heat pressing for 10 minutes No puncture occurred.

(b): 30% Water Content Raw Material

Heat pressing for 4 minutes A puncture occurred.
Heat pressing for 6 minutes No puncture occurred.
Heat pressing for 8 minutes No puncture occurred.
Heat pressing for 10 minutes No puncture occurred.

(c): 40% Water Content Raw Material

Heat pressing for 4 minutes A puncture occurred.
Heat pressing for 6 minutes A puncture occurred.
Heat pressing for 8 minutes A puncture occurred.
Heat pressing for 10 minutes A puncture occurred.

It is clear from the results of the comparison, in the case with the heat pressing apparatus of the present invention, no puncture was observed even when the board raw material having water content as high as 40% was heat-pressed for 8 minutes or 10 minutes. In contrast, in the case with the conventional heat pressing apparatus, a puncture was observed when the board raw material having water content of 30% was heat-pressed for 4 minutes, and when the board raw material having water content of 40% was heat-pressed independent of the heating time.

As has been described previously, in case of producing the woody material or woody board by heat-pressing the wood raw material with the adhesive added thereto, when the wood raw material is decompressed, a puncture occurs due to the steam generated in the interior of the wood raw material. In order to solve this problem, the wood raw material needs to be appropriately dried. This requires a significant amount of energy. The present invention enables production of a high-quality woody material made of a raw material having high water content without drying the raw material. This allows for a reduction in production costs and improvement in production efficiency. The present invention is thus very useful for energy savings, an urgent task for the present generation.

What is claimed is:

1. A heat pressing apparatus for heat-pressing a wood raw material with an adhesive added thereto to bond the wood raw material together by the adhesive upon hardening of the adhesive, and for forming the wood raw material into a woody material, the heat pressing apparatus comprising:

a heat pressing portion for heat-pressing the wood raw material, the heat pressing portion adapted to press upper and lower surfaces of the wood raw material, a degassing means in contact with the wood raw material for releasing steam generated within the wood raw material by the heat pressing, the degassing means adapted to cause the steam to be released outside the wood raw material through one of two side surfaces of the wood raw material, the side surfaces connecting the upper and lower surfaces of the wood raw material, the degassing means comprising:

a first pressure air supply means connected in contact with the upper surface of the wood raw material;

a second pressure air supply means connected in contact with the lower surface of the wood raw material;

a pressure air source in communication with the first and second pressure air supply means;

shields that shield the respective side surfaces of the wood raw material, the wood raw material being stacked in layers inside of the shields, the shields extending between edges of the first and second pressure air supply means such that the shields are adapted to extend over an entire surface area of the side surfaces of the layers of the wood raw material between the upper and lower surfaces;

a suction air source which maintains a space between the shields at a negative pressure; and an air vent formed through one of the shields for releasing the steam to the suction air source;

wherein:

when the wood raw material is heat-pressed, the degassing means is adapted to deliver pressurized air from the first and second pressure air supply means to pressurize the wood raw material simultaneously on both the upper surface and the lower surface of the wood raw material.

2. The heat pressing apparatus according to claim 1, wherein when the wood raw material is heat-pressed, the degassing means delivers pressurized air and discharges the pressurized air from the air vent of the shield to release the steam from the interior of the wood raw material to the outside in conjunction with discharging the pressurized air via the suction air source.

3. The heat pressing apparatus according to claim 1, wherein:

the heat pressing portion comprises a pair of heat plates.

4. The heat pressing apparatus according to claim 3, wherein the degassing means releases the steam from the interior of the wood raw material to the outside in conjunction with an air flow discharged from the air vent of the shield.

5. A heat pressing apparatus according to claim 1, wherein:

the heat pressing apparatus comprises a continuous heat pressing apparatus, and the heat pressing portion continuously heat-presses the wood raw material.

6. The heat pressing apparatus according to claim 1, wherein the wood raw material is heat-pressed using high frequency heating.

7. The continuous heat pressing apparatus according to claim 5, wherein the wood raw material is heat-pressed using high frequency heating.

* * * * *